US009452355B1

(12) United States Patent
Lin

(10) Patent No.: US 9,452,355 B1
(45) Date of Patent: Sep. 27, 2016

(54) GAME DESIGN BASED CAPTCHAS

(71) Applicant: KABAM, INC., San Francisco, CA (US)

(72) Inventor: Michael Lin, Saratoga, CA (US)

(73) Assignee: KABAM, INC., San Francisco, CA (US)

(*) Notice: Subject to any disclaimer, the term of this patent is extended or adjusted under 35 U.S.C. 154(b) by 283 days.

(21) Appl. No.: 14/306,165

(22) Filed: Jun. 16, 2014

(51) Int. Cl.

| | |
|---|---|
| ***A63F 13/00*** | (2014.01) |
| ***A63F 13/30*** | (2014.01) |
| ***A63F 13/79*** | (2014.01) |
| ***A63F 13/47*** | (2014.01) |
| ***A63F 13/70*** | (2014.01) |
| ***A63F 13/40*** | (2014.01) |
| ***A63F 13/533*** | (2014.01) |

(52) U.S. Cl.
CPC ............... *A63F 13/12* (2013.01); *A63F 13/40* (2014.09); *A63F 13/47* (2014.09); *A63F 13/533* (2014.09); *A63F 13/70* (2014.09); *A63F 13/79* (2014.09); *A63F 2300/303* (2013.01); *A63F 2300/535* (2013.01); *A63F 2300/5546* (2013.01); *A63F 2300/575* (2013.01)

(58) Field of Classification Search
CPC ...... A63F 13/40; A63F 13/47; A63F 13/533; A63F 13/70; A63F 13/79; A63F 2300/303; A63F 2300/535; A63F 2300/5546
See application file for complete search history.

(56) References Cited

U.S. PATENT DOCUMENTS 6,203,430 B1 * 3/2001 Walker ................ G06F 19/3456 273/143 R
8,298,079 B2 * 10/2012 Mori ....................... A63F 13/12 463/29
8,316,310 B2 * 11/2012 Champion ............ G06F 21/316 709/203
8,543,930 B2 * 9/2013 Champion ............ G06F 21/316 709/203
2002/0175464 A1 * 11/2002 Bryant .................... G07F 17/32 273/138.1
2003/0008705 A1 * 1/2003 Baerlocher ............. G07F 17/34 463/20
2004/0053680 A1 * 3/2004 Schultz ................... G07F 17/32 463/20
2004/0176156 A1 * 9/2004 Walker .................... G07F 17/32 463/16
2006/0252518 A1 * 11/2006 Walker ................ G07F 17/3267 463/25
2010/0262457 A1 10/2010 House ............................ 705/10
2013/0067573 A1 3/2013 Champion et al. ............. 726/22

OTHER PUBLICATIONS

Future Ad Labs Turns CAPTCHAs Into Mini-Games (And Ad Revenue), printed from http://techcrunch.com/2014/02/04/playcaptcha/, Apr. 17, 2014, 6 pages.
Yang-Wai Chow et al., CAPTCHA Challenges for Massively Multiplayer Online Games; Mini-game CAPTCHAs., 2010 10th International Conference on Cyberworlds, CW 2010, pp. 254-261.

* cited by examiner

*Primary Examiner* — Dmitry Suhol
*Assistant Examiner* — David Duffy
(74) *Attorney, Agent, or Firm* — Sheppard Mullin Richter & Hampton LLP

(57) ABSTRACT

A system and method configured to enhance gameplay between users in an online game and to deter the use of automated scripts in connection with online gameplay in order to achieve one or more advantages. In some implementations, the challenges are presented in-game as a pop-up window such that the player is presented with the challenge in this respect from time to time. In some implementations, the user is awarded virtual items in connection with a positive outcome response to the challenge while the user is penalized in some manner in connection with a negative outcome response. In some implementations, awards and penalties correlate to additions and subtractions of virtual items associated with the users inventory of virtual items. In some implementations, the negative value associated with a penalty is greater than the corresponding positive value of an award in connection with an applicable challenge.

20 Claims, 3 Drawing Sheets

GAME DESIGN BASED CAPTCHAS

FIELD OF THE DISCLOSURE

This disclosure relates to providing enhanced online game play particularly with respect to the use of game integrated captchas which deter the use of scripts that submit requests on behalf of users as well as scripts that copy and playback keystrokes.

BACKGROUND

Online games are subject to players attempting to gain an unfair advantage through the use of scripts which automate responses in connection with game interactions. For obvious reasons, this is undesirable from the perspective of game operators as well as other players.

These scripts may take various forms. In some cases, scripts are designed to submit requests on behalf of a user and simulate user interaction with the game. Other scripts may operate by recording a series of keystrokes and/or user input actions and playing them back one or more times in succession. One example of this is a "rapid fire" type script which performs actions faster than could otherwise be accomplished by a human. In this case, for example, the firing of a bullet could be recorded and a script could be designed to play back that action at a very fast speed (faster than could be achieved by manually pressing the "fire" button) so as to achieve an unfair advantage.

SUMMARY

One aspect of the disclosure relates to a system and method configured to enhance gameplay between users in an online game including the ability for game operators to deter the use of scripts in connection with gameplay through the use of in-game CAPTCHAS (Completely Automated Public Turing Test to tell Computers and Humans Apart). In some implementations, the system and method include executing an instance of an online game, and using the instance of the online game to facilitate participation by the users in the online game via a game interface presented to the users on client computing devices, the users including a first user.

In some implementations, the system and method include maintaining inventories of virtual items under the control of the users, and storing associations between the users and virtual items under their control, said inventories including a first inventory associated with said first user.

In some implementations, the system and method includes effectuating presentation of a challenge interaction to the first user in the game interface, the challenge interaction presenting a choice to the first user to select between a penalty outcome and an award outcome, wherein the presentation of the challenge interaction indicates (i) the penalty outcome includes removing one or more virtual items from the first inventory and (ii) the award outcome includes adding one or more virtual items to the first inventory.

In some implementations, the system and method may selectively provide an award to said first user in response to the first user selecting the award outcome from the challenge interaction, such provision including adding one or more virtual items to the first inventory. In some implementations, the system and method may also include selectively providing a penalty to said first user in response to the first user selecting the penalty outcome from the challenge interaction, such provision including removing one or more virtual items from the first inventory.

In some implementations, the in-game CAPTCHAs may be designed such that the subject matter which is used to test for scripted responses is associated with game content and/or game play. As such, in some implementations, a CAPTCHA multiple possible responses may include at least one response that is associated with a positive outcome in connection with gameplay and also at least one response that is associated with a negative outcome impacting gameplay.

In some implementations, deterring scripting in an online game via the use of in-game CAPTCHAs may be performed by processors executing computer program components. In some implementations, the system may include one or more servers. The server(s) may be configured to communicate with one or more client computing platforms according to a client/server architecture. The users may access the system via the client computing platforms, for instance, to interact with an online game.

The server(s) may be configured to execute one or more computer program components to provide one or more games to users (or players). The computer program components may include one or more of a game component, a user component, a user challenge component, an award component, a penalization component and/or other components. It is noted that the client computing platforms may include one or more computer program components that are the same as or similar to the computer program components of the server(s) to facilitate individualized interaction with the users of online games.

The game component may be configured to execute an instance of an online game, and to use the instance of the online game to facilitate participation of users in the online game via a game interface presented to the users on client computing devices, the users including a first user.

The user component may be configured to manage inventories of virtual items under the control of the users, and to store associations between the users and virtual items under their control, said inventories including a first inventory associated with said first user.

The user challenge component may be configured to effectuate presentation of a challenge interaction to the first user in the game interface, the challenge interaction presenting a choice to the first user to select between a penalty outcome and an award outcome, wherein the presentation of the challenge interaction indicates (i) the penalty outcome includes removing one or more virtual items from the first inventory and (ii) the award outcome includes adding one or more virtual items to the first inventory.

The award component may be configured to selectively provide an award to said first user in response to the first user selecting the award outcome from the challenge interaction, such provision including adding one or more virtual items to the first inventory.

The penalization component may be configured to selectively provide a penalty to said first user in response to the first user selecting the penalty outcome from the challenge interaction, such provision including removing one or more virtual items from the first inventory.

One aspect of the disclosure relates to a computer-implemented method for deterring scripting in connection with online games, the method being implemented in a computer system that includes one or more physical processors and storage media storing machine-readable instructions. The method may be implemented in a computer system that includes one or more physical processors and storage media storing machine-readable instructions. The method includes executing an instance of an online game. The method may further include implementing the instance of the online game to facilitate participation of the user in the online game. The method may further include managing inventories of virtual items under the control of the individual users in the online game, such inventories including a first inventory of one or more virtual items under control of a first user in the online game.

The method may further include effectuating presentation of a challenge interaction to the first user in the game interface, the challenge interaction presenting a choice to the first user to select between a penalty outcome and an award outcome, wherein the presentation of the challenge interaction indicates (i) the penalty outcome includes removing one or more virtual items from the first inventory and (ii) the award outcome includes adding one or more virtual items to the first inventory.

The method may further include selectively providing an award to said first user in response to the first user selecting the award outcome from the challenge interaction, such provision including adding one or more virtual items to the first inventory and may also include selectively providing a penalty to said first user in response to the first user selecting the penalty outcome from the challenge interaction, such provision including removing one or more virtual items from the first inventory.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
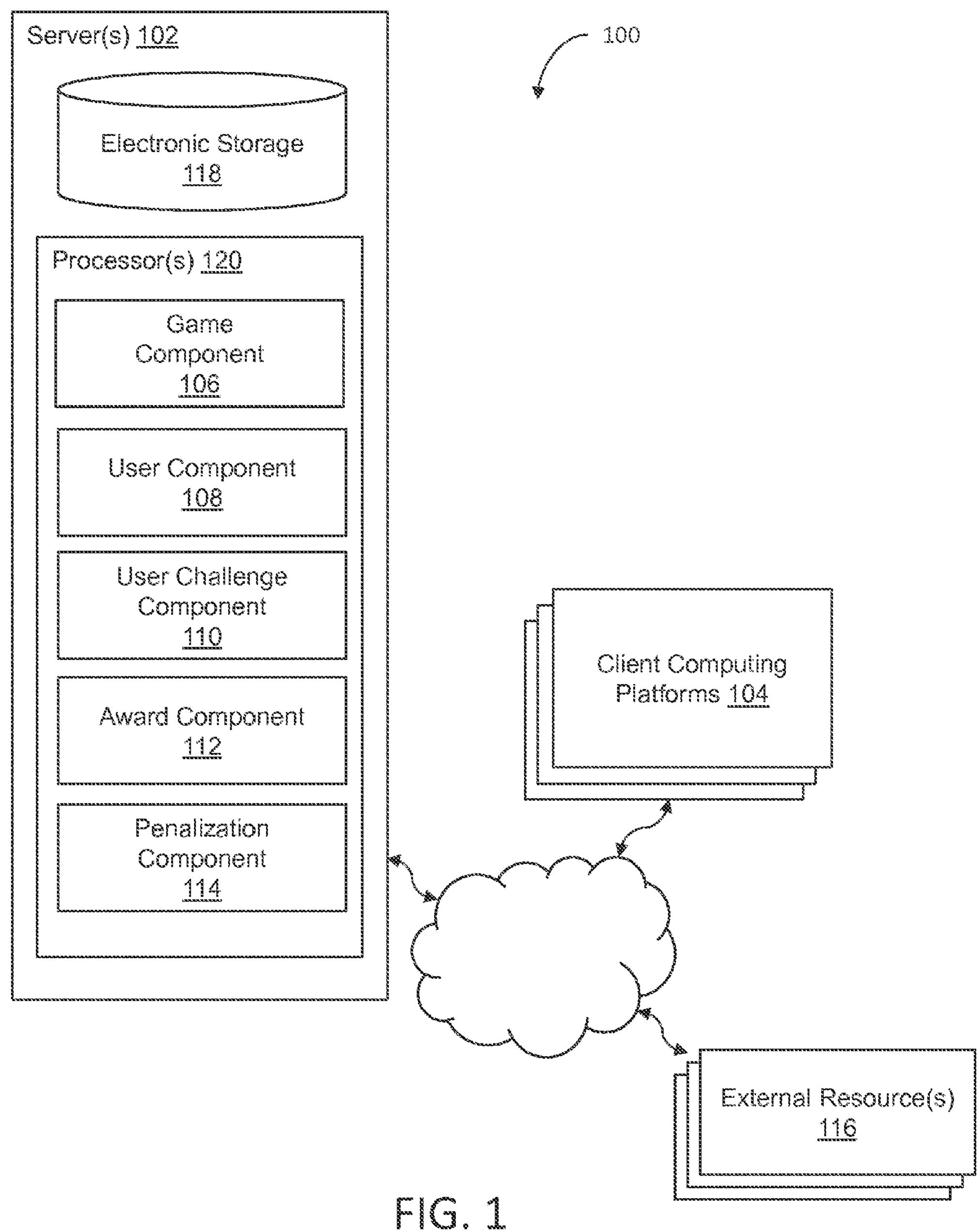
FIG. 1 illustrates a system configured to provide a virtual space and providing enhanced gameplay via the use of in-game CAPTCHAs to deter scripting, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, a system and methodology is provided which enhances the online gaming experience by deterring the use of scripts by players in connection with online games. According to the present invention, a system and methodology is provided in which in-game CAPTCHAs are presented to users from time to time. These CAPTCHAs require a response from a player that generally requires human interaction to select the correct response. In some implementations, the CAPTCHA comprises a game related notification and/or event with multiple potential responses available to the user. In some embodiments, the responses are designed such that it should be clear to a human interacting with the CAPTCHA as to which of the available responses are associated with a positive game outcome and which are associated with a negative outcome so that the user can easily select the response with the positive outcome so that he or she can benefit in connection with gameplay.

While a non-human interaction such as that resulting from the implementation of a script may successfully select the positive response some percentage of the time, it is exceedingly unlikely that it will select the positive response all of the time or even a significantly over 50% of the time. By designing CAPTCHAs such that the positive response to the challenge is readily apparent to a human interacting with the challenge (typically via an in-game pop-up menu), the resulting success rate is likely to approach 100%. However, these same challenges will not be readily apparent to non-human responders such as scripts and thus, over time, the success rate for selecting a positive response is likely to approach 50% in the case, for example, of a challenge with two alternative responses.

Challenges may alternatively have any number of alternative responses such that the more alternative negative outcomes presented, the lower the success rate for selecting a positive response is likely to be while a human interacting with the script should still approach a 100% success rate for selecting a positive outcome. Examples of CAPTCHAs which may be used include those associated with the specific game being played at the time. For example, challenges may include the presentation of a situation related to game play wherein the available responses may include a choice of one or more responsive actions desired by the user. By way of example and not limitation, a player may be presented with a situation such as an opposing force getting ready to attack with possible responses of: (i) let them in and provide them with resources; or (ii) alert the guards, invoke defensive procedures and seek to capture the enemy weapons. In this case, a player selecting choice (ii) may be rewarded with one or more enemy weapons while a script selecting choice (i) may be penalized through the loss of guards and/or resources.

In some implementations, the CAPTCHAs are presented in-game as a pop-up window such that the player is presented with the challenge in this respect from time to time. CAPTCHA challenges may also occur via other forms such as in various virtual locations within the game space, in a separate window (outside of the game space) on the device being used by the player (e.g. PC, game console, smartphone, etc.) as well through other presentations. In some implementations, the CAPTCHA challenges are presented at predetermined time intervals (e.g. every 15 minutes during gameplay) but other alternatives may also be employed. Other examples include presentation only at the beginning of game play, presentation at random times during game play, presentation upon the occurrence of one or more events associated with game play (e.g. at level up) as well as other frequencies and intervals.

In some implementations, the system and methodology of the present invention function to deter the use of scripts through the use of a novel award/penalty strategy associated with response to CAPTCHA challenge responses. In some implementations, the value of the award presented in connection with a response associated with a positive outcome is of less value then the value of the penalty associated with a response associated with a negative outcome for the same challenge. For example, for a challenge with two possible responses, one of which is associated with a positive outcome (e.g. capture enemy weapons) and one of which is associated with a negative outcome (e.g. loss of guards/resources), the award for the positive outcome response may have a value of a gain of 100 resources while the penalty for a negative outcome response may have a value of a loss of 200 resources. As will be readily apparent, these numbers and the ratio of gain to loss is merely an example and a practically unlimited set of awards and penalties and value ratios between them associated with each challenge may be implemented.

According to the teachings of the present invention, awards and penalties may be associated with the collection of resources associated with and available to each of the players. Thus, a player may be awarded one or more virtual items for a correct response. These virtual items may be added to the inventory associated with the player in the event of a correct response. Alternatively, virtual items may be removed from the player's inventory in connection with a negative outcome CAPTCHA response. In some implementations, awards may be virtual items which are usable in-game or outside of the game. However, awards can be anything which is perceived as valuable and/or desirable either in connection with game play or otherwise. Similarly, penalties can be the taking of anything which is perceived as valuable and/or desirable, or alternatively, the taking of some action which is perceived as negative by the player. Examples of the latter may include, for example, lowering a player's level in a game, barring a player from a game for some time or permanently, identifying the player publicly as one who has failed one or more challenges, etc. Each of these negative actions taken against a player may be imposed based upon a single CAPTCHA challenge failure or based on some predetermined number of failures. As noted above, failing CAPTCHA challenges may also result in the removal of desirable and/or valuable items from a player's inventory.

According to some implementations of the present invention, the implementation of a methodology in which the expected value for making a random guess (as essentially done when scripts are used) in response to a CAPTCHA challenge is negative, serves to deter the use of scripting. This is due to the fact that, over time, if the penalty associated with a negative outcome response is of greater negative value than the positive value associated with a positive outcome response, then a series of random guesses will eventually result in a loss of value. By way of example, assume a reward/penalty structure which awards 500 valuable resources for a positive outcome response but which removes 1200 valuable resources for a negative outcome response. If a human player correctly selects a positive outcome associated with a challenge 100% over a sequence of 10 challenges, then the net award to the player will be a gain of 5000 resources. Alternatively, if a series of 10 random guesses (as might be generated by a script) had a 50% success rate, then a net loss of 3500 (2500 gain less 6000 loss) resources would be achieved.

It is desirable that challenge responses made by humans approach 100%. Thus, in some implementation, the system and methodology of the present invention may include the requirement of a confirmation action following the challenge response. This may be implemented to minimize unintentionally negative outcome responses by a player that is simply not paying attention. In some implementations, the presentation of a challenge may include a notification which details the impact of either or both of a positive outcome and a negative outcome response to a challenge. For example, a pop-up window presenting a CAPTCHA challenge query may also include text that informs a player that, for example, a positive outcome response will result in the player adding 10 virtual swords to his or her inventory of available virtual items while an negative outcome response will result in the player having 20 virtual swords removed from his or her inventory of available virtual items.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program components. The computer program components may include one or more of a game component 106, a user component 108, a user challenge component 110, an award component 112, a penalization component 114 and/or other components. As noted, the client computing platform(s) 104 may include one or more computer program components that are the same as or similar to the computer program components of the server(s) 102 to facilitate in-game actions.

Game component 106 may be configured to execute an instance of a game to facilitate presentation of the game to users. The game component 106 may be configured to implement in-game actions in the instance of the game, in response to action requests for the in-game actions by the users. Game component 106 may also be configured to provide pop-up menus and/or other interactive functionality to allow CAPTCHA challenges to be presented to players/users either in-game or otherwise. Game component 106 may be configured to present challenge questions to players/users, and solicit and accept responses thereto. As noted above, game component 106 may also be configured to require a confirmation from a player/user following a response in order to assure that the challenge response was not made in error.

The game may be provided via a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102. In implementations, the game component 106 may also be configured to implement the delivery of promotional avatars to qualified player in connection with in-game implementation as described herein.

The user component 108 may be configured to maintain inventories of virtual items under the control of the users, and to store associations between the users and virtual items under their control. These virtual items may be purchased and/or otherwise awarded to the users and inventories of such items are maintained by the system of the present invention under the control of user component 108. User component 108 may be configured to maintain information about virtual items added to an inventory of a user that is controlled by the selected user in the virtual space. Virtual items include virtual goods and/or currency that the user can use in a virtual space. Virtual items include items, such as currency, awards, bonuses, power ups, and quests, etc. In some implementations, virtual items may include a probability item.

User challenge component 110 may be configured to effectuate presentation of a challenge interaction to the first user in the game interface, the challenge interaction presenting a choice to the first user to select between a penalty outcome and an award outcome, wherein the presentation of the challenge interaction indicates (i) the penalty outcome includes removing one or more virtual items from the first inventory and (ii) the award outcome includes adding one or more virtual items to the first inventory.

In some implementations, and as noted above, user challenge component 110, in connection with game component 106, may present a CAPTCHA challenge to a user at one or more pre-determined or random points during game play. These challenges may take the form of questions, situations, events, choices associated with gameplay content and/or other forms of challenges. The challenges presented, particularly if the challenges are questions, may have at least two potential alternative responses and possibly more. As discussed above, by using a higher number of potential negative outcome alternative responses, there will be an expected higher divergence in percentage of positive outcome responses as between a human responder and a machine based script response. By selecting the number of potential responses as well as the relative values associated with positive and negative outcome responses, a game operator enjoys a great deal of control over awards given, the negative impacts associated with using scripts and the expected values for responses generally.

In some implementations, the relative negative value associated with a negative outcome response should be greater than the positive value associated with a positive outcome response. Again, and as discussed above, this is so that the expected outcome associated with using a script or other automated mechanism for responding to challenges is negative. As noted above, in some implementations, users may be presented with information detailing the respective values of a positive outcome response and/or a negative outcome response. Further, the system and methodology of the present invention may, in some implementations, require a user to confirm a response before such response is analyzed by the system so as to minimize unintentional negative outcome responses as well as further deter the use of automated scripts.

Award component 112 is configured to selectively provide an award to a first user in response to the first user selecting the award outcome from the challenge interaction, such provision including adding one or more virtual items to a first inventory associated with the user.

In some implementations, when the user selects the positive outcome choice in response to the challenge, award component 112 responds by awarding the user with something of value and/or desirable. This may comprise virtual goods which are usable in connection with the applicable game, other games or even unrelated to any games. These virtual goods may provide users with a higher status in a game, a tool providing a player with a higher chance of success in a game, something enhancing the user's standing in-game as well as other awards of value.

As noted above, in some implementations and in response to a correct challenge response, award component 112 interacts with user component 108 to add items of value to the users inventory of items. In other implementations, it is also possible for items of value to be presented to users in other ways such as providing users with valuable items which are not managed in connection with the virtual inventory of the user. Examples include emailing or otherwise providing coupons, awards, incentives and/or other items of value.

Penalization component 114 may be configured to selectively provide a penalty to said first user in response to the first user selecting the penalty outcome from the challenge interaction, such provision including removing one or more virtual items from the first inventory. In a similar fashion to the way the award component 112 provides items of value to the user in connection with a positive outcome response, penalization component 114 is configured to penalize the user for negative outcome response in one or more ways.

In some implementations, penalization component 114 may be configured to remove virtual items of value from a user's inventory in connection with user component 108. In some implementations, other negative actions may be taken against a user that has responded with one or more negative outcome responses such as in game types of actions. These may include a loss or lowering of status, a public notice about some level of incorrect responses to challenges as well as other negative actions. As noted above, in some implementations, it is preferable that the negative value associated with a negative outcome response to a specific challenge is higher than the relative positive value associated with a positive outcome response to a challenge.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute components 106, 108, 110, 112 and 114. Processor 120 may be configured to execute components 106, 108, 110, 112 and 114 by software; hardware; firmware; some combination of software, hardware, and/or firmware; and/or other mechanisms for configuring processing capabilities on processor 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 112 and 114 are illustrated in FIG. 1 as being implemented within a single processing unit, in implementations in which processor 120 includes multiple processing units, one or more of components 106, 108, 110, 112 and 114 may be implemented remotely from the other components.

The description of the functionality provided by the different components 106, 108, 110, 112 and 114 described above is for illustrative purposes, and is not intended to be limiting, as any of components 106, 108, 110, 112 and 114 may provide more or less functionality than is described. For example, one or more of components 106, 108, 110, 112 and 114 may be eliminated, and some or all of its functionality may be provided by other ones of components 106, 108, 110, 112 and 114. As another example, processor 120 may be configured to execute one or more additional components that may perform some or all of the functionality attributed below to one of components 106, 108, 110, 112 and 114.

Figure 2:
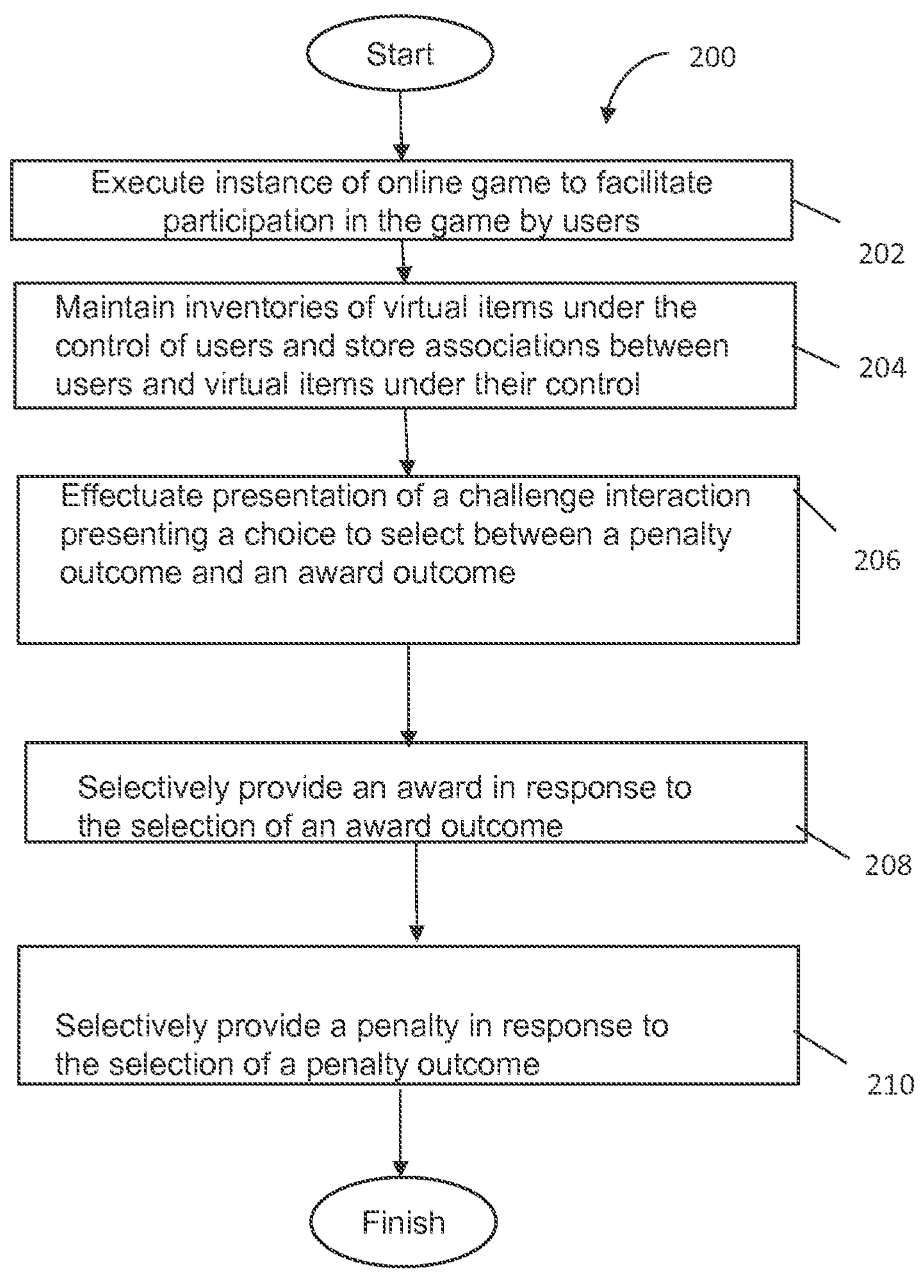
FIG. 2 illustrates a method of hosting a virtual space to client computing devices for interaction by users, including providing enhanced gameplay via the use of in-game CAPTCHAs to deter scripting.

FIG. 2 illustrates a method for deterring the use of scripts in connection with online game play, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate participation in the game by users. Facilitating participation in the online game may include executing actions in the instance of the online game in response to receiving action requests from the user. Operation 202 may be performed by a game component that is the same as or similar to game component 106, in accordance with one or more implementations.

At an operation 204, inventories of virtual items under the control of users are maintained and associated with users which control said virtual items. Operation 204 may be performed by a user component that is the same as or similar to user component 108, in accordance with one or more implementations.

At an operation 206, users are presented with a CAPTCHA or other type of challenge interaction. This interaction may be presented in-game or externally to the game and may be comprised of questions, situations, events, choices associated with gameplay content and/or other challenge types. Users may be presented with one or more possible responses and/or the awards or penalty values associated with a positive outcome response and a negative outcome response, respectively. Operation 206 may be performed by a user challenge component that is the same as or similar to user challenge component 110, in accordance with one or more implementations.

At an operation 208, the system may award one or more items of value to a user in connection with a positive outcome response to a challenge. This may occur, in some implementations, through the addition of these one or more items to the inventory of virtual items associated with the applicable user. Operation 208 may be performed by an award component that is the same as or similar to award component 112, in accordance with one or more implementations.

At an operation 210, the system may impose one or more penalties to a user in connection with a negative outcome response to a challenge. This may occur, in some implementations, through the subtraction of one or more items from the inventory of virtual items associated with the applicable user. Operation 210 may be performed by a penalization component that is the same as or similar to penalization component 114, in accordance with one or more implementations.

Figure 3:
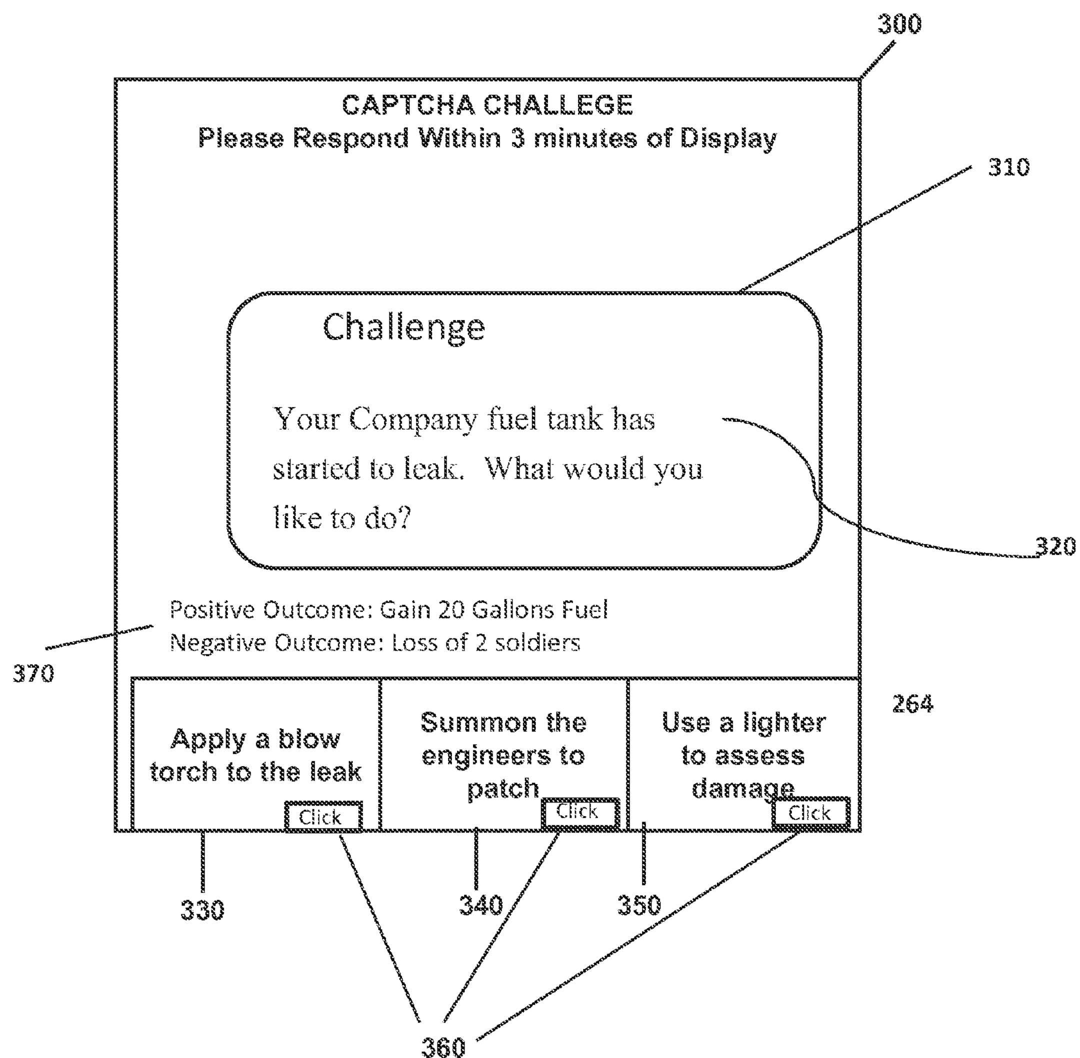
FIG. 3 illustrates an exemplary design of a pop-up window for providing a challenge to a user, in accordance with one or more implementations.

FIG. 3 is an exemplary screen shot of a pop-up window 300 which could be used in connection with the present invention. This pop-up window 300 may operate under the control of, either or both of game component 106 and/or user challenge component 110 or other combinations of components. In this example, the user is presented with a CAPTCHA challenge requiring a response.

As can be seen, in exemplary implementations, pop-up window 300 for presenting a challenge to a user during gameplay may include a message at the top of the window which may, for example, indicate that the display represents a CAPTCHA challenge and that a response is required within three minutes of the initial display of pop-up 300. In some implementations, the failure to respond within the required timeframe may be considered as an incorrect response. Window 310 may present a challenge 320 such as "Your fuel tank has started to leak. What would you like to do?". Possible responses presented might be: (i) Apply a blow torch to the leaking area; (ii) Summon the engineers to patch the tank; or (iii) Use a lighter to assess the extent of the damage. As can be seen, in some implementations, these responses are obviously answered by a human such that the likely success rate approaches 100%.

In some implementations, various alternative responses may be presented in windows 330, 340, and 350 and/or other display areas of pop-up 300. In this example, there are three alternative responses with only one, the engineer patching response in window 340 being the positive outcome response. Users may be prompted to click on one of the associated elements 360 for each possible response in order to select the desired response. As noted, a positive outcome response in this example would be for the user to click on element 360 associated with response window 340. This would result in the user receiving 20 gallons of fuel added to his or her virtual item inventory. Clicking on other elements would result in a negative outcome response generating the negative outcome of two solider deaths.

In some implementations, the user may be notified via a message such as message 370 of the implications of a positive outcome response and/or an negative outcome response.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing enhanced gameplay between users in a virtual space, the system comprising:

one or more physical computer processors configured by machine-readable instructions to:

execute an instance of an online game, and to use the instance of the online game to facilitate participation of users in the online game via a game interface presented to the users on client computing devices, the users including a first user;

maintain inventories of virtual items under the control of the users, and to store associations between the users and virtual items under their control, said inventories including a first inventory associated with said first user;

effectuate presentation of a challenge interaction to the first user in the game interface, the challenge interaction presenting a choice to the first user to select between a penalty outcome and an award outcome, wherein the presentation of the challenge interaction indicates (i) the penalty outcome includes removing one or more virtual items from the first inventory and (ii) the award outcome includes adding one or more virtual items to the first inventory;

selectively provide an award to said first user in response to the first user selecting the award outcome from the challenge interaction, such provision including adding one or more virtual items to the first inventory; and selectively provide a penalty to said first user in response to the first user selecting the penalty outcome from the challenge interaction, such provision including removing one or more virtual items from the first inventory.

2. The system of claim 1 wherein said virtual items are usable in said online game.

3. The system of claim 1 wherein the number of virtual items associated with the award outcome exceeds the number of virtual items associated with the penalty outcome.

4. The system of claim 1 wherein the expected value associated with a random response to said challenge interaction is negative.

5. The system of claim 1 wherein said challenge interaction comprises a pop-up displayed within said online game.

6. The system of claim 5 wherein said pop-up displays said challenge interaction and wherein said challenge interaction comprises a single question with two potential responses.

7. The system of claim 5 wherein said pop-up comprises at least two clickable potential responses to said challenge interaction.

8. The system of claim 1 wherein said one or more physical computer processors are further configured to require a confirmation from said first user following a selection by said first user.

9. The system of claim 1 wherein said one or more physical computer processors periodically generate challenge interactions during said first user's participation in said online game at predetermined time intervals.

10. The system of claim 1 wherein said one or more physical computer processors periodically generate challenge interactions during said first user's participation in said online game in response to one or more events associated with said online game.

11. A method of providing enhanced gameplay between users in a virtual space, the method comprising:

executing an instance of an online game, and using the instance of the online game to facilitate participation of users in the online game via a game interface presented to the users on client computing devices, the users including a first user;

maintaining inventories of virtual items under the control of the users, and storing associations between the users and virtual items under their control, said inventories including a first inventory associated with said first user;

effectuating presentation of a challenge interaction to the first user in the game interface, the challenge interaction presenting a choice to the first user to select between a penalty outcome and an award outcome, wherein the presentation of the challenge interaction indicates (i) the penalty outcome includes removing one or more virtual items from the first inventory and (ii) the award outcome includes adding one or more virtual items to the first inventory;

selectively providing an award to said first user in response to the first user selecting the award outcome from the challenge interaction, such provision including adding one or more virtual items to the first inventory; and selectively providing a penalty to said first user in response to the first user selecting the penalty outcome from the challenge interaction, such provision including removing one or more virtual items from the first inventory.

12. The method of claim 11 wherein said virtual items are usable in said online game.

13. The method of claim 11 wherein the number of virtual items associated with the award outcome exceeds the number of virtual items associated with the penalty outcome.

14. The method of claim 11 wherein the expected value associated with a random response to said challenge interaction is negative.

15. The method of claim 11 wherein said challenge interaction comprises a pop-up displayed within said online game.

16. The method of claim 15 wherein said pop-up displays said challenge interaction and wherein said challenge interaction comprises a single question with two potential responses.

17. The method of claim 15 wherein said pop-up comprises at least two clickable potential responses to said challenge interaction.

18. The method of claim 11 further comprising the step of requiring a confirmation from said first user following a selection by said first user.

19. The method of claim 11 further comprising the step of periodically generating challenge interactions during said first user's participation in said online game at predetermined time intervals.

20. The method of claim 11 further comprising the step of periodically generating challenge interactions during said first user's participation in said online game in response to one or more events associated with said online game.

* * * * *